United States Patent
Yaremenko et al.

(10) Patent No.: US 11,826,793 B2
(45) Date of Patent: Nov. 28, 2023

(54) COLLAPSIBLE CONTAINMENT BERM

(71) Applicant: Donmark Holdings Inc., Delta (CA)

(72) Inventors: Victor Yaremenko, Delta (CA); Bryan Shields, Delta (CA); Paul Reichard, Delta (CA)

(*) Notice: Subject to any disclaimer, the term of this patent is extended or adjusted under 35 U.S.C. 154(b) by 0 days.

(21) Appl. No.: 16/905,527

(22) Filed: Jun. 18, 2020

(65) Prior Publication Data
US 2021/0001387 A1  Jan. 7, 2021

Related U.S. Application Data (60) Provisional application No. 62/862,929, filed on Jun. 18, 2019.

(51) Int. Cl.
 *B08B 17/02* (2006.01)
 *F16N 31/00* (2006.01)

(52) U.S. Cl.
 CPC .......... *B08B 17/025* (2013.01); *F16N 31/006* (2013.01)

(58) Field of Classification Search
 CPC ... F16N 31/006; B08B 17/025; B65D 88/005; B65D 90/02; B65D 90/023; B65D 90/048; B65D 90/047; B65D 90/046; B65D 90/04
 USPC ........................................................ 220/9.3
 See application file for complete search history.

(56) References Cited

U.S. PATENT DOCUMENTS

| | | | | |
|---|---|---|---|---|
| 92,364 A | * | 7/1869 | Rider | A47K 3/064 5/98.1 |
| 1,753,427 A | * | 4/1930 | Phillips | A47K 3/06 4/507 |
| 2,950,484 A | * | 8/1960 | Jaffe | A47K 3/064 5/98.1 |
| 5,090,588 A | * | 2/1992 | Van Romer | B64D 1/16 220/573 |
| 5,316,175 A | * | 5/1994 | Van Romer | F16N 31/006 220/4.12 |
| 5,762,233 A | * | 6/1998 | Van Romer | F16N 31/006 220/573 |
| 5,924,461 A | * | 7/1999 | Shaw | F16N 31/006 141/86 |

(Continued)

FOREIGN PATENT DOCUMENTS

| | | | |
|---|---|---|---|
| CA | 2979028 A1 | 9/2006 | |
| WO | WO-9410498 A1 * | 5/1994 | .......... F16N 31/006 |
| WO | 2014134549 A1 | 9/2014 | |

*Primary Examiner* — Valentin Neacsu
*Assistant Examiner* — Eric C Baldrighi (57) ABSTRACT

A collapsible containment berm having a floor and a peripheral sidewall, a plurality of brace assemblies integrally carried on an external surface of the sidewall and on an adjacent underside surface of the floor, each brace assembly comprising a rigid sidewall support member connected to the external surface of the sidewall and oriented upright when deployed, a rigid buttress member having a first end and an opposite second end, and hingedly connected to an upper end of the sidewall support member that allows the buttress member to arc toward or away from the sidewall, a rigid floor member hingedly connected at the third end to the other end of the buttress member, and a sleeve connected to the underside of the floor and adapted to receive the floor member. The floor member slides in and out of the sleeve and moves the buttress member in and out of a bracing position with respect to the sidewall.

19 Claims, 7 Drawing Sheets

(56) References Cited

U.S. PATENT DOCUMENTS

| | | | | |
|---|---|---|---|---|
| 6,092,686 A * | 7/2000 | Shaw | | E04H 4/0056 220/573 |
| 6,880,720 B2 * | 4/2005 | Van Romer | | F16N 31/006 220/573 |
| 7,036,676 B2 * | 5/2006 | Christensen | | E04H 4/0056 220/565 |
| RE39,971 E | 1/2008 | Van Romer | | |
| 7,374,062 B2 | 5/2008 | Van Romer | | |
| 7,506,777 B2 * | 3/2009 | Ramp | | B08B 17/00 220/9.4 |
| 8,464,885 B2 | 6/2013 | Ramp et al. | | |
| 8,562,251 B2 | 10/2013 | Beak et al. | | |
| 8,662,335 B2 * | 3/2014 | Van Romer | | E03F 11/00 220/9.2 |
| 8,955,703 B2 * | 2/2015 | McAtarian | | F16N 31/006 220/9.2 |
| 9,091,032 B2 * | 7/2015 | Laing | | F16N 31/006 |
| 9,181,026 B2 | 11/2015 | Laing et al. | | |
| 9,586,715 B2 * | 3/2017 | Beak | | F16N 31/002 |
| 9,726,323 B2 | 8/2017 | Beak et al. | | |
| 9,869,427 B2 | 1/2018 | McAtarian et al. | | |
| 10,024,486 B2 | 7/2018 | Starr et al. | | |
| 2003/0029873 A1 * | 2/2003 | Moffat | | F16N 31/006 220/573 |
| 2008/0164263 A1 | 7/2008 | Van Romer | | |
| 2009/0175684 A1 | 7/2009 | Barrett et al. | | |
| 2011/0174813 A1 | 7/2011 | Ramp et al. | | |
| 2014/0246441 A1 * | 9/2014 | Starr | | F16N 31/006 220/571 |
| 2016/0185523 A1 * | 6/2016 | Starr | | F16N 31/006 248/346.5 |
| 2017/0122640 A1 * | 5/2017 | Chen | | E01C 13/105 |

* cited by examiner

COLLAPSIBLE CONTAINMENT BERM

FIELD OF THE INVENTION

The present invention is broadly concerned with mobile collapsible containment berms that can be quickly erected in the field for the containment of hazardous liquids or solids. More particularly, the invention is concerned with such berms that comprise a unified bottom and upright side walls to define a relatively large volume containment reservoir or zone, and have support structures for maintaining the sidewall in its upright position, and that are collapsible and foldable into a relatively flat configuration for storage or transport.

BACKGROUND OF THE INVENTION

Containment berms are usually used in the field during the transfer or storage of environmentally hazardous liquids, such as petrochemicals, to collect and retain any spills of the hazardous materials and prevent environmental contamination. Typically, these containment berms are foldable units that can be erected on the site. The berm floor is placed under a potential source of spillage and the berm sidewall is then erected around the perimeter and supports are provided to maintain the sidewall upright and prevent collapse under the influence of the weight of any hazardous material. Typically, the supports are separate rigid members that are each connected to the sidewall and spaced apart at a distance that enables them to provide adequate support for the sidewall. The problem often encountered with such prior art designs relying on separate support parts is that parts can be tedious to install and are often temporarily misplaced or lost, resulting in a shortage of support members for adequate sidewall support. Often such shortage is not discovered until at the site on which the containment berm is required to be erected. Also, it is common for such containment berms to be used to isolate tanker vehicles carrying hazardous liquids while such as are being offloaded in the field. Typically, the berm floor is placed on the ground and the vehicle is driven onto the floor, after which the sidewalls are raised. It is common practice to collapse only a sidewall as required to enable the vehicle to drive onto or off the berm floor. In the prior art devices, this requires the tedious removal and storage of each independent rigid structural support member, followed by the replacement and reconnection of each support members to the sidewall in order to re-establish the structure of the containment berm.

SUMMARY OF THE INVENTION

The present invention provides a containment berm that can be rapidly and easily assembled or disassembled using integral support members without reliance on any external parts, and on which selected support members can be stowed to allow a single side wall or portion thereof to collapse so that vehicles can be driven into the containment berm. The support structure is preferably in the form of a plurality of support or brace assemblies secured to the outer surface of the berm sidewall that may be deployed to prevent collapse of the sidewall or stowed to allow collapse of the sidewall for storage.

The present invention provides a collapsible containment berm having a liner or floor and an easy to erect sidewall support or brace assemblies that enable a user to quickly set up without reliance on extraneous parts that may be finicky to install and easily misplaced. The containment berm of the present invention enables vehicles to enter and exit the containment area when a portion of the sidewall is collapsed. The sidewall is supported by a plurality of brace assemblies, preferably positioned on the external surface of the sidewall and integral therewith. Each brace assembly preferably comprises a rigid floor member that slides in and out of a pocket or sleeve provided on the underside of the floor. The end of the floor member that is remote from the sleeve is hinged to a rigid buttress member, which in the deployed position, inclines inward toward the top rim of the sidewall and is hinged to a rigid sidewall support member that is itself parallel with the sidewall and permanently affixed thereto so that the brace assembly is integral with the sidewall. Accordingly, the buttress member is hinged about a horizontal hinge axis such that it can be pivoted from a position close to or in abutment with the sidewall support member (hence the sidewall) to the support position in which it is inclined relative to the sidewall support member and sidewall. Collapse of a portion of the sidewall is achieved by sliding the floor member of an adjacent brace assembly into the sleeve which draws the hingedly connected buttress member inward and in abutment with the sidewall support member, and thus enabling both of these members to be folded down, inwardly or outwardly, together with the sidewall portion.

In one aspect, the present invention provides a collapsible containment berm for containing spilled material and that may be easily folded for transport comprising: a floor and a peripheral sidewall that together define a containment zone; a plurality of brace assemblies integrally carried on the sidewall and on an adjacent surface of the floor, the plurality of brace assemblies being spaced around the sidewall wall to brace said sidewall in an upright orientation when deployed, each brace assembly comprising: a rigid sidewall support member connected to the surface of the sidewall and oriented upright when deployed, a rigid buttress member having a first end and an opposite second end, and hingedly connected at the first end to an upper end of the sidewall support member that allows the second end of the buttress member to arc toward or away from the sidewall support member; a rigid floor member having a third end and an opposite fourth end, and hingedly connected at the third end to the second end of the buttress member; and a sleeve connected to the floor and adapted to receive the floor member; wherein with the floor member received within the sleeve the buttress member is in parallel abutment with the sidewall support member such that the brace assembly is in the stowed position, and with the floor member partially withdrawn from the sleeve the buttress member is inclined toward the upper end of the sidewall support member to support the sidewall support member and an adjacent portion of the sidewall upright such that the brace assembly is in a deployed position.

In some embodiments, the apparatus further comprises a stop member cooperating with the floor member to prevent complete withdrawal of the floor member from the sleeve.

In some embodiments, the sidewall support member is connected to an external surface of the sidewall. In some embodiments, the sleeve is connected to an underside of the floor.

In some embodiments, the stop member comprises a flexible linkage connecting the floor member to the sleeve or to the floor. In some embodiments, the flexible linkage is of a length that allows a range of motion of the floor member to move between the deployed position and the stowed position. In some embodiments, the flexible linkage is of a length that allows a range of motion of the floor member to move between the deployed position and the stowed position.

In some embodiments, the sidewall support member, the buttress member and the floor member are each elongate and planar, and each hinged connection between respective members defines an axis of rotation perpendicular to a longitudinal axis of the members.

In some embodiments, the sidewall support member, the buttress member and the floor member are each enveloped between two layers of flexible material into discrete rigid sections, and the hinged connection between respective members comprises a strip of flexible material between the rigid sections.

In some embodiments, the flexible linkage passes through the sleeve and connects the floor member to the floor. In some embodiments, the flexible linkage is of a length that allows a range of motion of the floor member to move between the deployed position and the stowed position.

In some embodiments, the sidewall defines corners and the apparatus further comprises a corner brace assembly at each corner, the corner brace assembly having an elongate rigid corner support member, and a second sleeve integrally connected to the sidewall and extending diagonally from a top of the corner toward the floor, the second sleeve being adapted to receive the corner support member for a close fit.

In some embodiments, the apparatus further comprises a flexible connecter connecting the corner support member to the second sleeve.

Accordingly, the sidewall support mechanism of the present invention comprises of the plurality of brace assemblies that can be moved between a supporting (deployed) position and a collapsed (stowed) position. The sidewall is collapsible from a containment position to allow for easy set up and tear down as well as access for vehicles or other objects to the floor. The sidewall support and sidewall are subsequently movable back to their containment and supporting positions. The sidewall support has no loose parts or external components that need to be attached or installed by the user. Instead everything comes together as one assembly. The sidewall support has enough strength to withstand the hydrostatic head pressure when the fluid containment area is full.

BRIEF DESCRIPTION OF THE DRAWINGS

Further features and advantages will be apparent from the following detailed description, given by way of example, of preferred embodiments taken in conjunction with the accompanying drawings, wherein.

DETAILED DESCRIPTION

Referring to FIGS. 1-5 an embodiment of a collapsible containment berm in accordance with the present invention is shown generally at 10. Containment berm 10 has a floor 12 with an upstanding, continuous, foldable sidewall 14 (also referred to herein as a peripheral wall). The floor 12 and sidewall 14 cooperatively present an internal containment zone 16 capable of containing liquids, such as for example environmentally hazardous chemicals.

Figure 1:
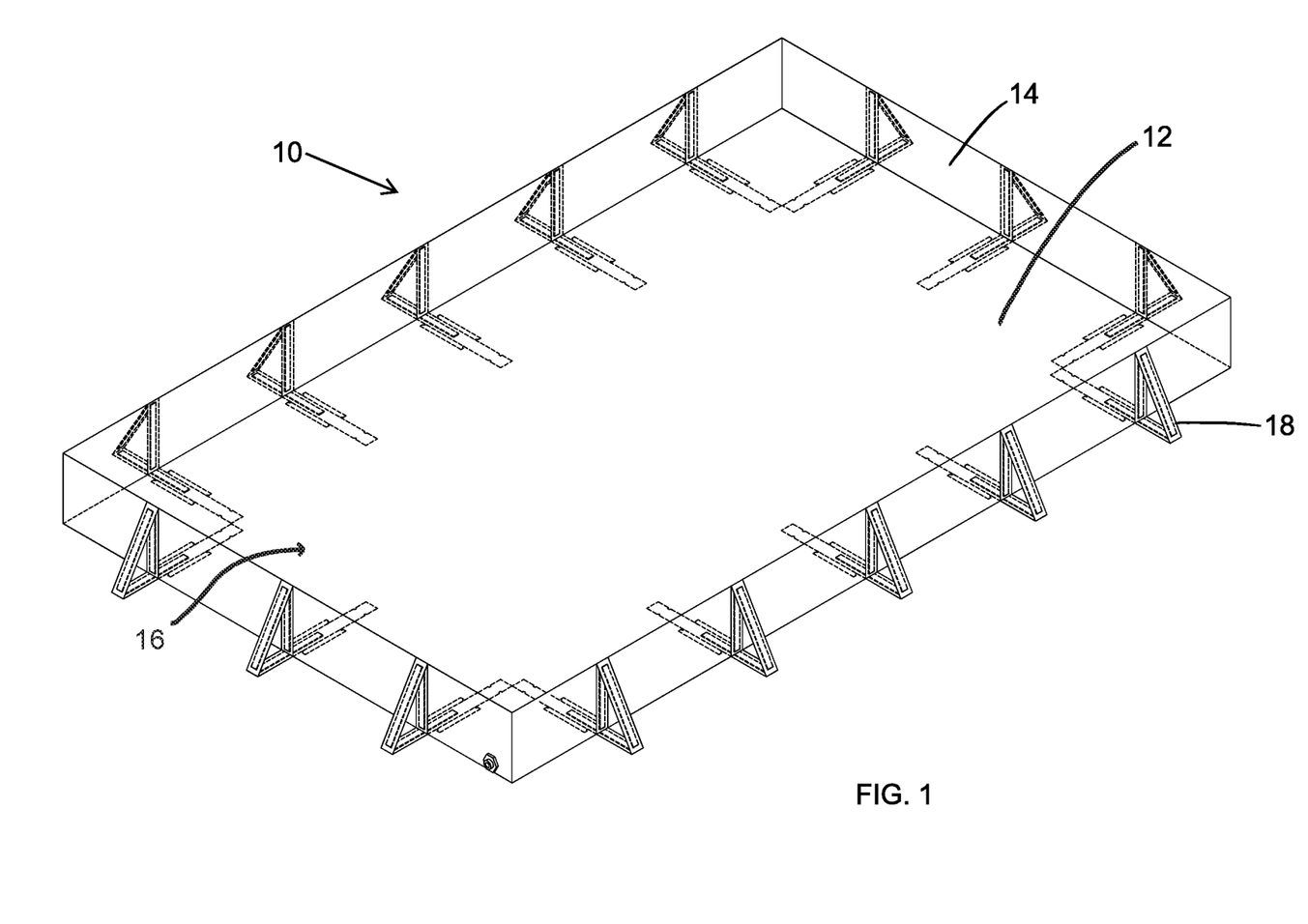
FIG. 1 is a perspective view of an embodiment of a collapsible containment berm in accordance with the present invention.

The floor 12 and sidewall 14 comprise a durable, flexible, liquid impervious material, e.g., a thermal bonded material. For example, a thermal bonded material having a thickness of from about 18-40 Mil. is typically used but such material of other thicknesses may be used. Generally, liquid impervious materials for containment berm construction are well known in the field of collapsible containment berms and would be well within the knowledge of skilled reader. In some embodiments, the floor 12 may be of a thicker material as compared with the sidewall 14. Preferably, the floor 12 and sidewall 14 are welded or otherwise integrally attached so that the containment zone 16 is liquid tight. Alternately, a unitary sheet of material may be used for both the floor 12 and sidewall 14, thus eliminating any joints between the floor and sidewall. The preferred berms 10 are portable, foldable, and may be easily erected in the field while being capable of holding large quantities of liquid or solid hazardous material.

The sidewall 14 is supported by brace assemblies 18 that are each permanently connected to the external surface 19 of sidewall 14 and the external (underside) surface 50 of floor 12 so as to be integral with the containment berm 10. The brace assemblies 18 are spaced apart on the external surface 19 about the perimeter of sidewall 14. The number and spacing of the brace members 18 is preferably a balance between minimizing the total number of brace assemblies 18 required to provide a requisite amount of support to the sidewall 14, and may vary according to the size of the containment berm, the height of the sidewall 14 and the forces on the sidewall intended to be counteracted.

Figure 2:
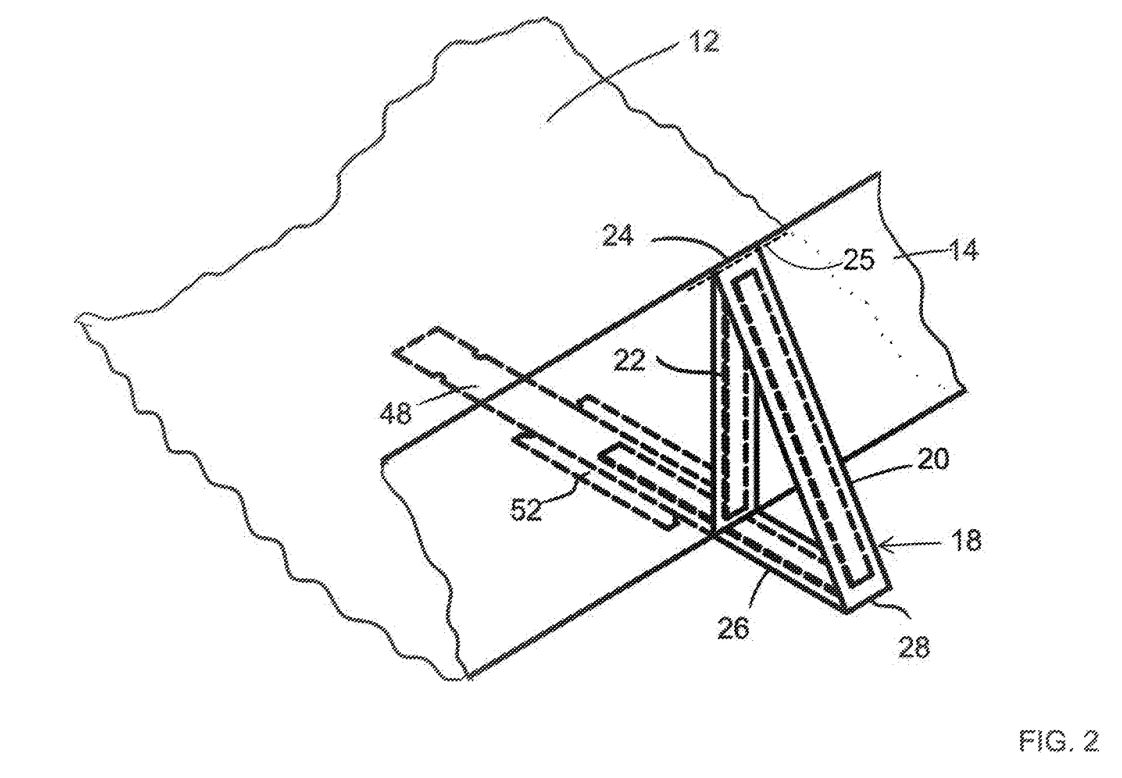
FIG. 2 is a close-up of one of the brace assemblies of the embodiment of FIG. 1.
Figure 3:
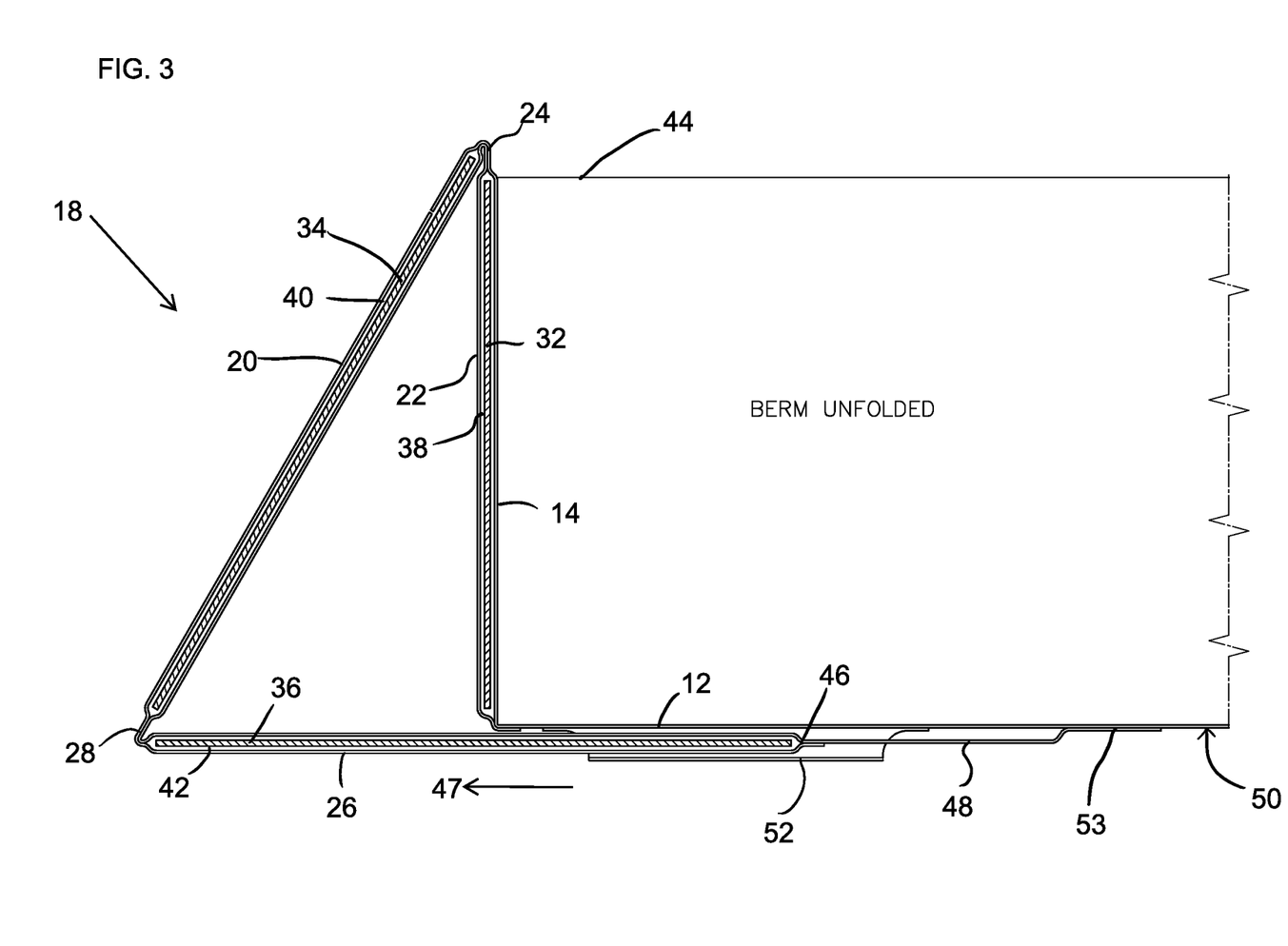
FIG. 3 is a cross section of a brace assembly in the deployed, support position together with a portion of the supported sidewall and floor of the embodiment of FIG. 1.

Each brace assembly 18 comprises a rigid buttress member 20 hingedly connected at one end, also referred to herein as a first end, to an upper end of a rigid sidewall support member 22 at a flexible hinge 24. The other end, also referred to herein as a second end, of the buttress member 20 is hingedly connected to an end, also referred to herein as a third end, of a rigid floor member 26 at a flexible hinge 28.

In the embodiment shown in the drawings, the sidewall support member 22, the buttress member 20, and the floor member 26 are each formed by enclosing a rigid stiffener member 32,34,36 preferably made of metal, rigid plastic, fiberglass, or other suitable rigid material within a sheath 38,40,42 of a relatively durable sheet material, the sheet material being of sufficient thickness and flexibility such that the sheet material itself defines the flexible hinges 24 and 28. For example, the sheet material may be the same material from which the floor 12 of the containment berm 10 is constructed. Hence the sidewall support member, the buttress member and the floor member may be each elongate and planar, and each hinged connection between respective members defines an axis of rotation perpendicular to a longitudinal axis of the members. And the sidewall support member, the buttress member and the floor member may be each enveloped between two layers of flexible material into discrete rigid sections, and the hinged connection between respective members comprises a strip of flexible material between the rigid sections.

Alternatively, independent rigid components 32 and 36, functioning as the sidewall support and floor member respectively, can be hinged to a separate rigid component 34, functioning as a buttress member, to comprise a brace assembly. In such alternative embodiments, the rigid member 32 for the sidewall support is permanently fixed to the sidewall 14 so that the brace assembly is integral with the sidewall of the containment berm.

Referring back to the illustrated embodiment, buttress member 20 is longer than sidewall support member 22 such that when the brace assembly is in the deployed support position the buttress member 20 is inclined inward and upward toward the sidewall support member 22 and an upper lip or rim 44 of the sidewall 14 as shown in the FIGS. 2 and 3. Hence the buttress member 20 counteracts forces tending to push the sidewall 14 outward. Accordingly, the buttress member 20 is hinged at flexible hinge 24 about a horizontal hinge axis 25 such that it can be pivoted from a position close to or in abutment with the sidewall support member 22 (hence the sidewall 14) to the support position in which it is inclined relative to the sidewall support member 22 and sidewall 14. In other words, the second end of the buttress member is able to arc toward or away from the sidewall support member.

Figure 4:
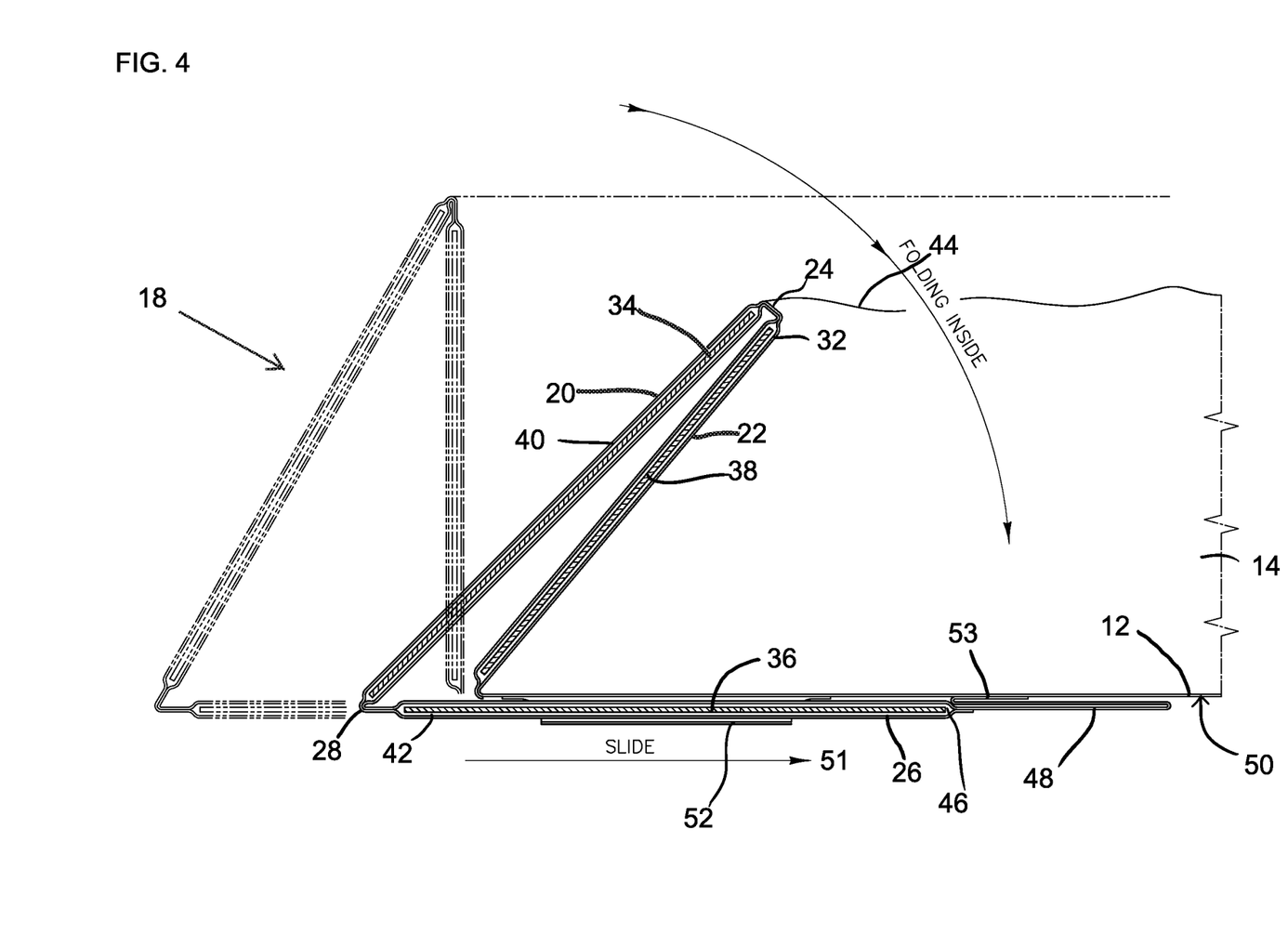
FIG. 4. is a cross section of a brace assembly in FIG. 3 shown being folded inward from the support position (in phantom lines)
Figure 5:
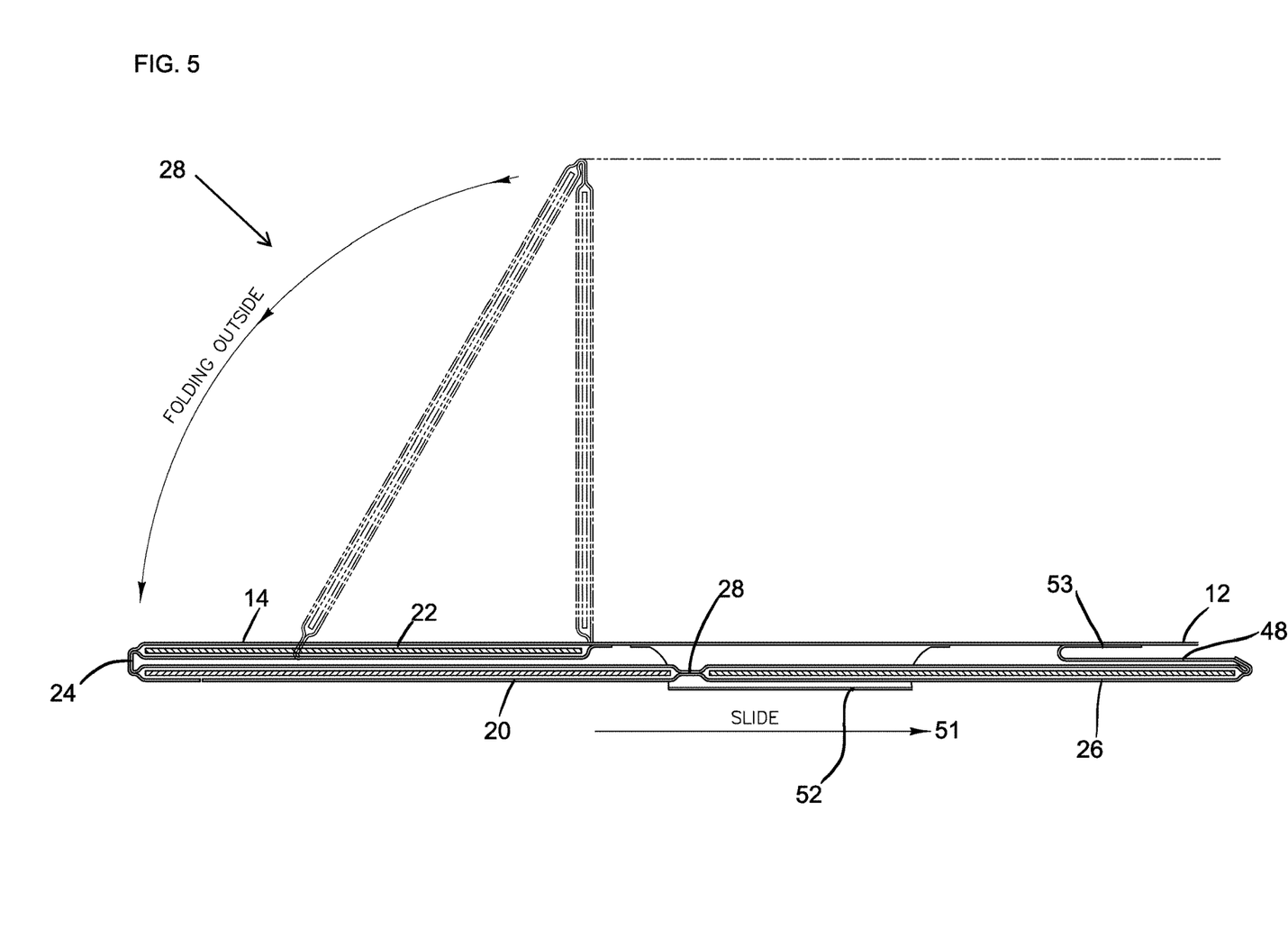
FIG. 5 is a cross section of a brace assembly in FIG. 3 shown in an outward stowed position after being folded outward from the support position (in phantom lines) to be co-planar with the floor.

As best shown in FIGS. 3-5, the end 46 of the floor member 26 remote from flexible hinge 28 is connected by a flexible connecter or linkage 48, preferably comprising a strip of the same material as the floor, to a portion 53 of the external surface or underside 50 of the floor 12 at a location inward from the sidewall 14. A pocket or sleeve 52 also on the underside 50 envelopes at least a portion of the floor member 26 and receives the floor member 26 for reciprocating sliding movement therein.

In the stored configuration of the brace assembly 18, the floor member 26 is slid inward into the sleeve 52 such that the buttress member 20 abuts the sidewall support member 22 as both of these members are folded inward together with sidewall 14 to enable collapse of the brace member 18 together with the adjacent portion of the sidewall 14 as shown in FIG. 4 until the buttress member 20, sidewall support member 22 and the adjacent portion of the sidewall lay against the floor 14. Alternatively, the floor member 26 is slid inward into the sleeve 52 and the buttress member 20 and sidewall member 22, together with the adjacent portion of the sidewall 14, may be folded outwardly as shown in FIG. 5 until they lay flat against the ground, co-planar with the floor 12, thus effecting a collapse of that portion of the sidewall 14. The containment berm 10 may, in either case, be folded up for storage or transport once all brace assemblies 18 are thus stowed.

Referring to FIGS. 3-5, in the illustrated embodiment, the flexible linkage 48 preferably has a length that permits the floor member 26 to be withdrawn from the sleeve 52 only as far as is necessary to move the buttress member 20 into a deployed support position, in which it is inclined toward the sidewall support member 22 toward an upper lip 44 of the sidewall 14 (FIG. 4), but no farther to prevent full withdrawal of the floor member 26 from the sleeve 52. This facilitates rapid deployment of each brace assembly 18 by simply sliding the floor member 26 outward in direction 47 until the flexible linkage 48 draws taut and functions as a stop to further withdrawal of the floor member 26 from the sleeve 26. When the brace assembly 18 is being stowed, the flexible linkage 48 simply accumulates or folds as the floor member 26 is pushed into the sleeve 48 (FIGS. 4 and 5).

In alternate embodiments, the flexible linkage 48 may be omitted so that there would not be a stop to prevent the complete withdrawal of the floor member 26 from the sleeve 52. In yet other embodiments, a stop may be provided by other mechanisms, such as for example structures on the floor member 26 and/or sleeve 52 that engage with each other to provide similar functionality of the flexible linkage 48 in the illustrated embodiment. Furthermore, in alternate embodiments, the pocket or sleeve 52 may be a rigid member as opposed to being constructed of flexible material as in the illustrated embodiment.

In the deployed position in which the sidewall 14 is supported by the brace assembly 18, the floor member 26 is slid outward of the sleeve 52 in direction 47, drawing the attached bottom of the buttress member 20 with it, until the flexible linkage 48 draws taut and stops further withdrawal of the floor member 26 from the sleeve 26. In this position, the buttress member 20 is inclined into the sidewall support member 22 as show in FIG. 3 and thereby provides lateral support for same against forces tending to urge the sidewall 14 outward. As discussed above, stowing the brace assembly 18 simply requires the floor member 26 to be pushed into the sleeve 52 in direction 51, drawing the bottom of the buttress member 20 with it, and folding of the buttress member 20, sidewall member 22 and the associated portion of the sidewall 14 either inward onto the floor 12 or outward onto the ground in order to flatten the containment berm 10 to be folded for storage or transport.

To deploy the containment berm 10, the containment berm 10 is unfolded on site, pulled flat to ensure there are no wrinkles in the floor 12, and the entire unit is moved into position. The integral brace assemblies 18 should be facing up. Beginning at one corner of the containment berm 10, a user holds up the portion of the sidewall 14 and pulls the floor member 26 outward until it is fully extended by operation of the stop provided by the flexible linkage 48 having been drawn taut. The brace assembly 18 is thus in the support position to hold up that portion of the sidewall 14. The user then moves to an adjacent brace assembly 18 and repeats the process. After all brace assemblies 18 have been deployed, the user pulls on the outside edge of the containment berm 10 to remove all wrinkles in the floor 12. To disassemble the containment berm 10 or to lower only a portion of the sidewall 14 to allow a vehicle to be driven onto the floor 12 of the containment berm, a user starts at one brace assembly 18 and slides the floor member 26 into the sleeve 52 and then folds the buttress member 20, sidewall support member 22 and sidewall 14 downward. For partial collapse of the sidewall 14, only those brace assemblies 18 need be stowed as necessary to flatten a sufficient length of the sidewall to allow a vehicle to drive on the floor 12. For complete disassembly, all brace assemblies 18 are stowed to flatten the entire containment berm 12 so that it may be folded or rolled up for storage or transport.

Referring to FIGS. 6-10 another embodiment of a collapsible containment berm in accordance with the present invention is shown generally at 100. Containment berm 100 has all structures of containment berm 10, and in addition it includes corner braces 110 that provide additional support for the corners 60 of containment berm 100.

Figure 6:
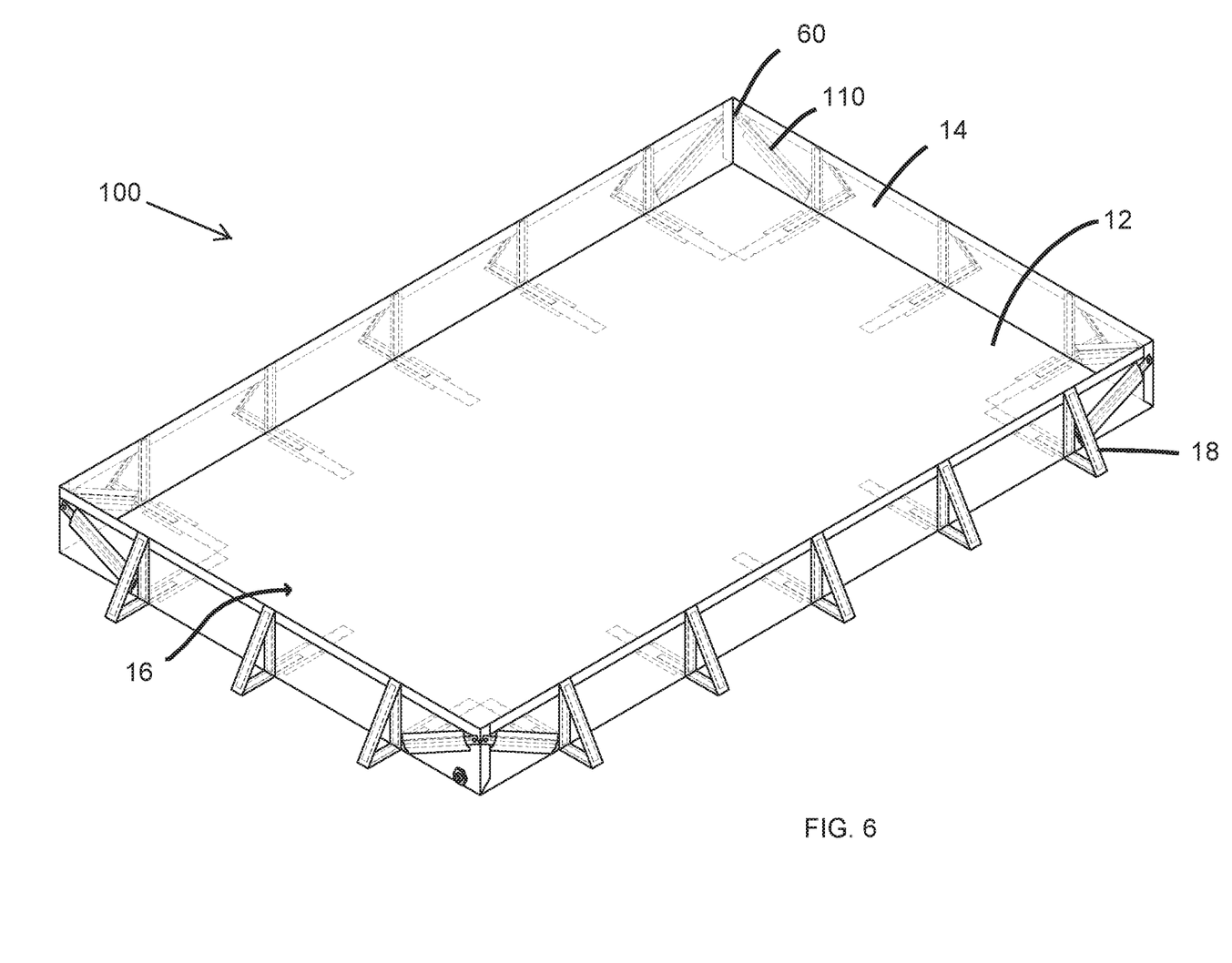
FIG. 6 is a perspective view of another embodiment of a collapsible containment berm in accordance with the present invention.
Figures 7, 8, 9, 10:
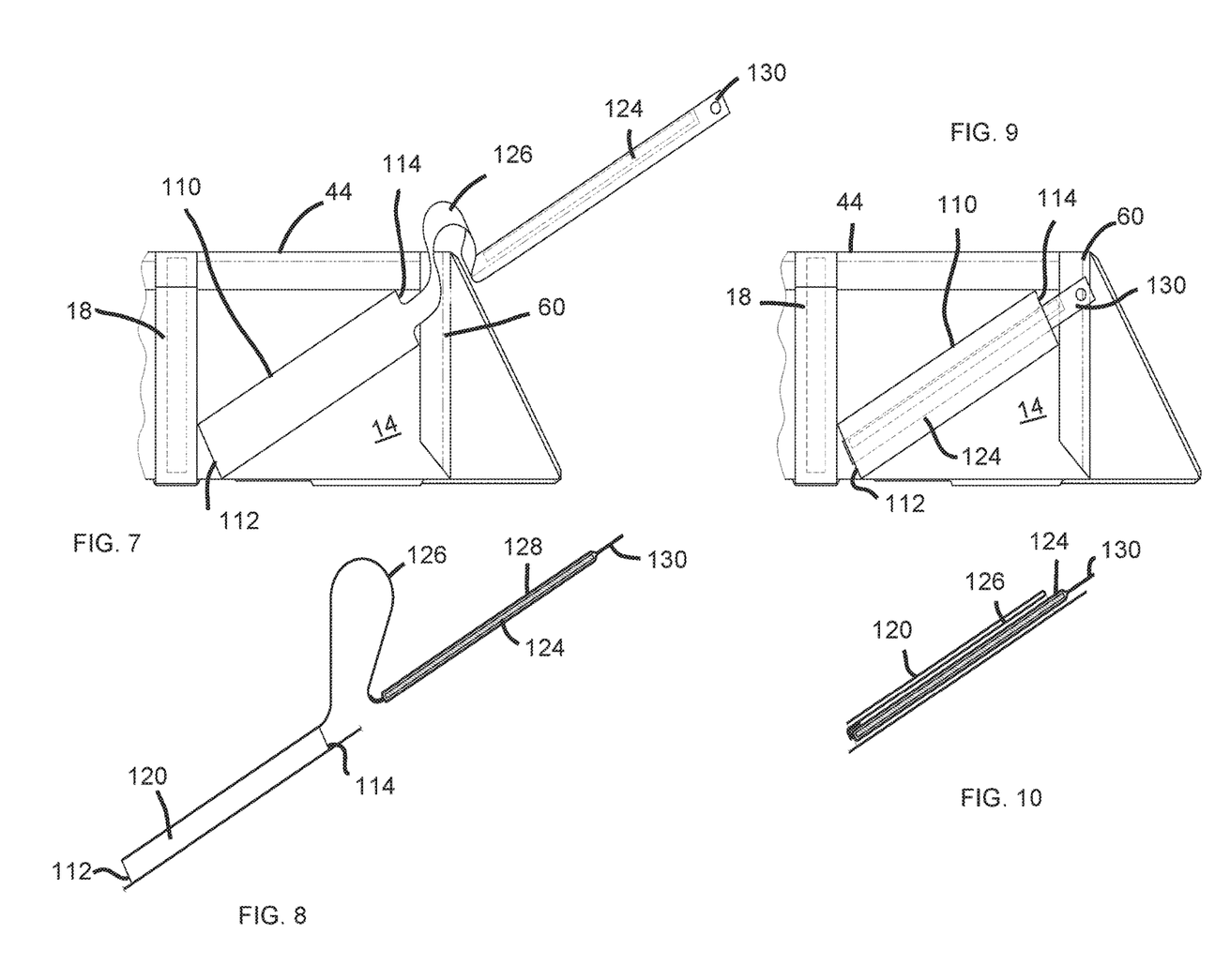
FIG. 7 is a close-up of one of the corner brace assemblies of the embodiment of FIG. 6 in the undeployed position, together with a portion of the sidewalls.
FIG. 8 is a longitudinal section of a corner brace assembly of FIG. 7.
FIG. 9 is a close-up of one of the corner brace assembly of FIG. 7 in a deployed position, together with a portion of the sidewalls.
FIG. 10 is a longitudinal section of a corner brace assembly of FIG. 9.

Corner brace assemblies 110 are each permanently connected to a surface of sidewall 14 to be integral with the containment berm 100. Preferably two corner brace assemblies 110 are located at each corner 60, with one corner brace assembly 110 on each side of corner 60. Each corner brace assembly 110 is preferably oriented diagonally with one end 112 adjacent the floor 12 and the other end 114 adjacent the upper rim 44 of the sidewall 14 at the corner 60. Preferably, the corner brace assembly 110 extends between a brace assembly 18 nearest a corner 60 and the corner 60.

Each corner brace assembly 110 comprises an elongate pocket or sleeve 120 that is connected to and integral with the sidewall 14, and an elongate rigid corner support member 124. The sleeve 120 is adapted to receive the corner support member 124 in a close fit such that with the corner support member 124 in the sleeve 120, the corner brace assembly 110 provides structural support to the adjacent portion of sidewall 14. Corner support member 124 may be a strip of metal, such as for example aluminum, or a strip of rigid plastic. Preferably corner support member 124 is connected to the sleeve 120 by a line or strap 126 to prevent corner support member 124 from being misplaced. Strap 126 may be the same material as the sleeve 120 and is sufficiently long to allow the corner support member 124 to be fully received within the sleeve 120. In the illustrated embodiment, corner support member 124 is enveloped within a material layer 128 that is connected to the strap 126. And a tab 130 is provided at a remote end by which a user may grasp the corner support member 120 for extraction from the sleeve 120 in the act of disassembling the containment berm 100.

The deployment and disassembly of containment berm 100 is in the same manner as with containment berm 10 described above, but with the additional deployment and disassembly of the corner brace assemblies 110 as follows. To deploy a corner brace assembly 110, the corner support member 124 is slid into its sleeve 120 to provide support to the adjacent portion of sidewall 14 and thus to the adjacent corner 60. To disassemble the corner brace assemblies 110, the corner support member 124 is withdrawn from its sleeve 120. The tab 130 facilitates grasping the corner support member 124 for this purpose. And the strap 126 maintains the corner support member 124 connected to prevent misplacement.

While specific embodiments of the invention have been described, such embodiments are illustrative of the invention only and should not be taken as limiting its scope. In light of the present disclosure, many modifications will occur to those skilled in the art to which the invention relates, and the invention, therefore, should be construed in accordance with the accompanying claims.

What is claimed is:

1. A collapsible containment berm for containing spilled material and that may be easily folded for transport comprising:
   a. a floor and a sidewall connected to the floor around a periphery of the floor, the floor bounded by the sidewall to define a containment zone, the floor having an inside surface and an underside surface that rests upon the ground or a support surface upon which the containment berm is placed;
   b. a plurality of brace assemblies integrally carried on the sidewall and cooperating with the underside surface of the floor, the plurality of brace assemblies being spaced around the sidewall wall to brace said sidewall in an upright orientation when deployed, each brace assembly comprising:
      i. a rigid sidewall support member connected to the surface of the sidewall and oriented upright when deployed,
      ii. a rigid buttress member having a first end and an opposite second end, and hingedly connected at the first end to an upper end of the sidewall support member that allows the second end of the buttress member to arc toward or away from the sidewall support member;
      iii. a rigid floor member having a third end and an opposite fourth end, and hingedly connected at the third end to the second end of the buttress member; and
      iv. a sleeve provided on the underside surface of the floor to receive the floor member;
   c. wherein the floor member is slidable within the sleeve, the floor member is received within the sleeve while in a stowed position and a deployed position, to position the buttress member into parallel abutment with the sidewall support member such that the brace assembly is in the stowed position enabling an adjacent portion of the sidewall to be folded inward onto the inside surface of the floor and outward to be co-planar with the floor, and to the floor member being partially withdrawn from the sleeve to position the buttress member to be inclined toward the upper end of the sidewall support member to support the sidewall support member and the adjacent portion of the sidewall upright such that the brace assembly is in the deployed position.

2. The collapsible containment berm as claimed in claim 1 further comprising a stop member cooperating with the floor member to prevent complete withdrawal of the floor member from the sleeve.

3. The collapsible containment berm as claimed in claim 2 wherein the sidewall support member is connected to an external surface of the sidewall.

4. The collapsible containment berm as claimed in claim 2 wherein the stop member comprises a flexible linkage connecting the floor member to the sleeve or to the underside surface of the floor.

5. The collapsible containment berm as claimed in claim 1 further comprising a stop member cooperating with the floor member to prevent complete with withdrawal of the floor member from the sleeve, wherein the stop member comprises a flexible linkage connecting the floor member to the sleeve or to the underside surface of the floor.

6. The collapsible containment berm as claimed in claim 4 wherein the flexible linkage is of a length that allows a range of motion of the floor member to move between the deployed position and the stowed position.

7. The collapsible containment berm as claimed in claim 5 wherein the flexible linkage is of a length that allows a range of motion of the floor member to move between the deployed position and the stowed position.

8. The collapsible containment berm as claimed in claim 1 wherein the sidewall support member, the buttress member and the floor member are each elongate and planar, and each hinged connection between respective members defines an axis of rotation perpendicular to a longitudinal axis of the members.

9. The collapsible containment berm as claimed in claim 8 wherein the sidewall support member, the buttress member and the floor member are each enveloped between two layers of flexible material into discrete rigid sections, and the hinged connection between respective members comprises a strip of flexible material between the rigid sections.

10. The collapsible containment berm as claimed in claim 5 wherein the flexible linkage passes through the sleeve and connects the floor member to the floor.

11. The collapsible containment berm as claimed in claim 10 wherein the flexible linkage is of a length that allows a range of motion of the floor member to move between the deployed position and the stowed position.

12. The collapsible containment berm as claimed in claim 1 wherein the sidewall defines corners and the apparatus further comprises a corner brace assembly at each corner, the corner brace assembly having an elongate rigid corner support member, and a second sleeve integrally connected to the sidewall and extending diagonally from a top of the corner toward the floor, the second sleeve being adapted to receive the corner support member for a close fit.

13. The collapsible containment berm as claimed in claim 12 further comprising a flexible connecter connecting the corner support member to the second sleeve.

14. The collapsible containment berm as claimed in claim 13 wherein the sidewall support member, the buttress member and the floor member are each enveloped between two layers of flexible material into discrete rigid sections, and the hinged connection between respective members comprises a strip of flexible material between the rigid sections.

15. The collapsible containment berm as claimed in claim 14 wherein the sidewall support member, the buttress member and the floor member are each elongate and planar, and each hinged connection between respective members defines an axis of rotation perpendicular to a longitudinal axis of the members.

16. The collapsible containment berm as claimed in claim 15 wherein the sidewall support member, the buttress member and the floor member are each enveloped between two layers of flexible material into discrete rigid sections, and the hinged connection between respective members comprises a strip of flexible material between the rigid sections.

17. The collapsible containment berm as claimed in claim 16 wherein the flexible linkage passes through the sleeve and connects the floor member to the floor.

18. The collapsible containment berm as claimed in claim 7 wherein the sidewall support member, the buttress member and the floor member are each elongate and planar, and each hinged connection between respective members defines an axis of rotation perpendicular to a longitudinal axis of the members.

19. The collapsible containment berm as claimed in claim 18 wherein the sidewall defines corners and the apparatus further comprises a corner brace assembly at each corner, the corner brace assembly having an elongate rigid corner support member, and a second sleeve integrally connected to the sidewall and extending diagonally from a top of the corner toward the floor, the second sleeve being adapted to receive the corner support member for a close fit.

* * * * *